United States Patent [19]

Tapperman et al.

[11] Patent Number: 4,703,874

[45] Date of Patent: Nov. 3, 1987

[54] METERING DEVICE FOR POWDERED MATERIAL

[75] Inventors: Henry Tapperman; Otto G. Vitzthum, both of Bremen; Heinrich Seekamp, Achim, all of Fed. Rep. of Germany

[73] Assignee: General Foods Hag, Bremen, Fed. Rep. of Germany

[21] Appl. No.: 853,535

[22] Filed: Apr. 18, 1986

[30] Foreign Application Priority Data

Apr. 19, 1985 [DE] Fed. Rep. of Germany ....... 3514336

[51] Int. Cl.⁴ ............................................. B65G 69/06
[52] U.S. Cl. .................................... 222/198; 222/231; 222/408.5; 222/503; 222/201; 251/212
[58] Field of Search .................................. 222/160–162, 222/196, 198–203, 168, 173, 226, 231, 251, 339, 408.5, 502, 503; 251/212; 366/108, 184; 99/287; 141/72, 349, 384

[56] References Cited

U.S. PATENT DOCUMENTS

| | | | |
|---|---|---|---|
| 664,477 | 12/1900 | Holtzclaw | 222/201 |
| 2,209,707 | 7/1940 | Shea | 222/557 X |
| 2,583,862 | 1/1952 | Lichtenstein | 222/200 X |
| 2,670,105 | 2/1954 | Huhn | 222/251 |
| 3,129,853 | 4/1964 | Hoskins | 222/339 |
| 3,212,683 | 10/1965 | Santomieri | 222/201 |
| 4,105,143 | 8/1978 | Blinn | 222/161 |
| 4,120,428 | 10/1978 | Boram | 222/201 |
| 4,279,364 | 7/1981 | Perez | 222/162 |
| 4,560,092 | 12/1985 | Souza | 222/168 |

FOREIGN PATENT DOCUMENTS 92154  4/1938  Sweden .............................. 222/503

Primary Examiner—H. Grant Skaggs
Assistant Examiner—Gregory L. Huson
Attorney, Agent, or Firm—Linn I. Grim; Daniel J. Donovan

[57] ABSTRACT

The metering device for powdered material comprises a storage container (10) for the powdered material and a discharge opening in the bottom of the storage container which is opened and closed, respectively, by a closing mechanism (12). The powdered material flows through the discharge opening into a drawing cup (13). In order to obtain a defined bulk density of the powdered material in the drawing cup (13), a vibration mechanism (14) imparts vibrations to the metering device when the discharge opening (11) is open. The closing mechanism (12) can be designed in the manner of a blade diaphragm, and in that case the closing mechanism (12) can be actuated by a grooved disk (17) which at the same time is a part of the vibration mechanism (14). The vibration mechanism (14) can also include a base disk (20) urging spring-biased elements (19) against a toothed ring (18) so that said elements (19) slide over the toothed ring (18), when the grooved disk (17) is rotated relative to the base disk (20), to produce vibration.

4 Claims, 3 Drawing Figures

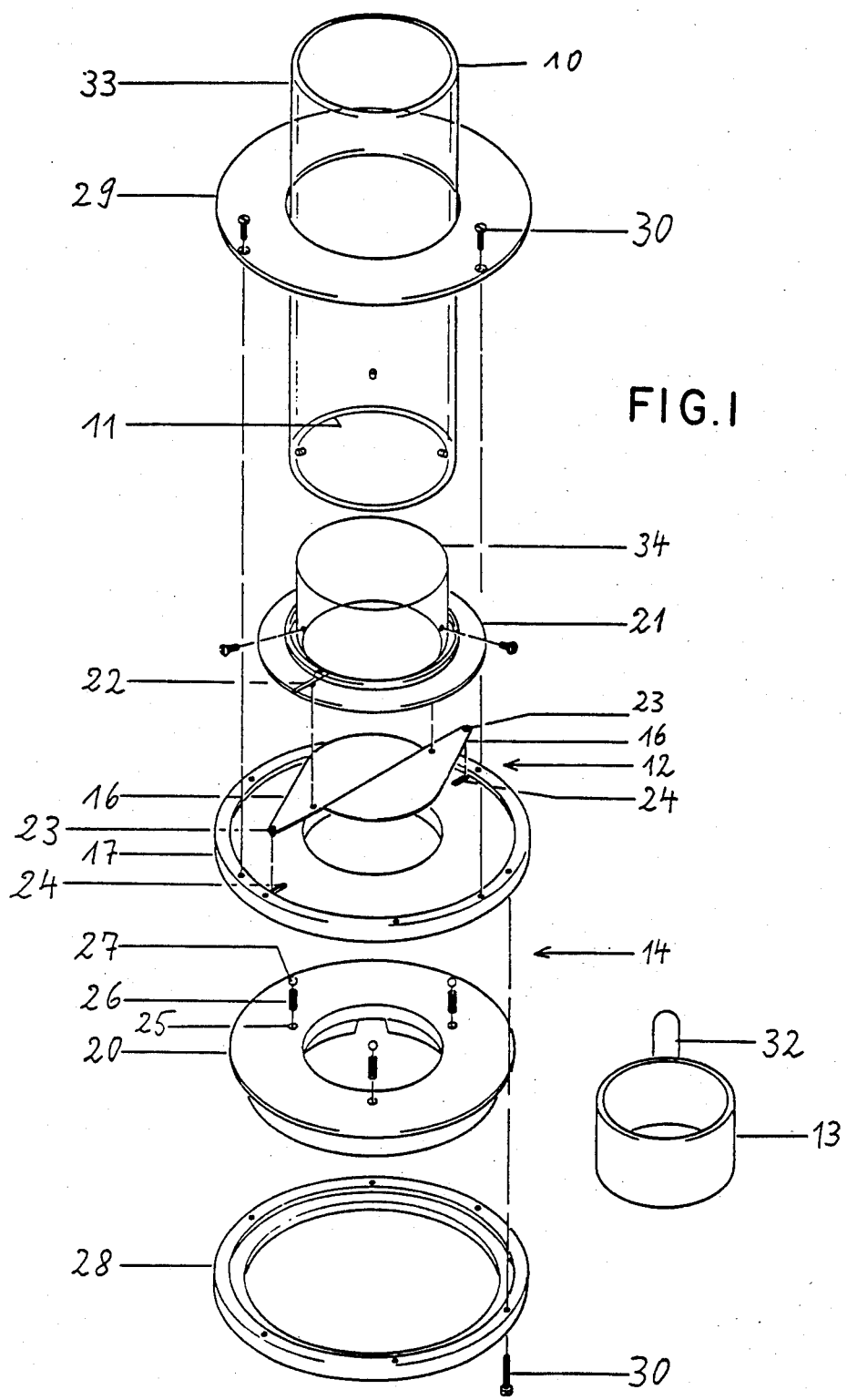

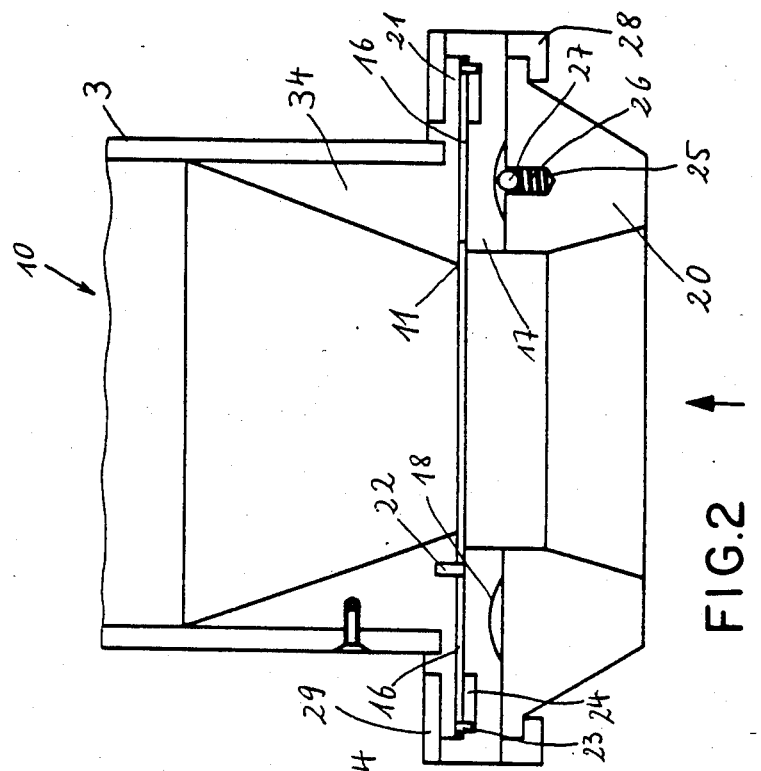
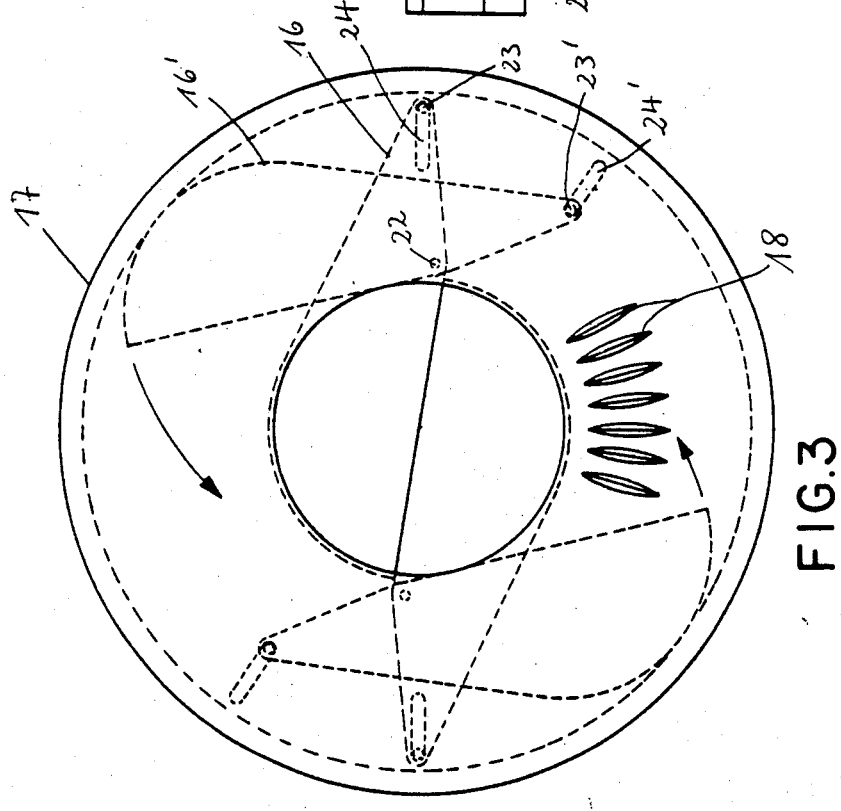

METERING DEVICE FOR POWDERED MATERIALCL DESCRIPTION

The invention relates to a metering device for powdered material in which the powdered material is stored in a storage container and is filled through a closable discharge opening in the bottom of the storage container into a drawing cup arranged therebelow. The discharge opening is opened and closed by a closing mechanism. The drawing cup has a defined volume and serves for receiving a predetermined quantity of the powdered material.

In such a metering device, which is generally known, the difficulty arises that the powdered material sometimes does not drop through the discharge opening by gravity due to tunneling caused within the storage container by electrostatic attraction. Secondly, especially powdered foods, such as coffee powder, milk powder, cocoa powder and the like, are highly compressible, so that the amount by weight of the powdered material received by the drawing cup largely depends on whether the powdered material flows loosely into the drawing cup or is pressed together by lumps that may have formed by compression.

In particular, in case of coffee powder it is important that invariably the same amount by weight of coffee powder is used for preparing a predetermined amount of coffee in order that coffee of the same good quality can be offered at all times.

The invention deals with the problem of providing a metering device by which a defined amount by weight of the powdered material can be metered and filled into a drawing cup.

This object is realized in that a vibration mechanism imparts to the metering device vibratory motion when the discharge opening is open.

It is the idea underlying the invention to determine the drawn weight of powdered material by the defined volume of the drawing cup. Since the powdered material has a widely varying bulk weight, the reproducibility of the drawn weights is achieved in that percussions or vibrations are imparted to the powdered material before the volume is measured.

Preferably the closing mechanism is designed similar to a diaphragm with blades. By rotating a grooved disk in which the one ends of the blades are guided, and which has a central opening in register with the discharge opening, the blades open and close, respectively, the discharge opening. The grooved disk may at the same time be a part of the vibration mechanism, so that with one movement the discharge opening can be opened and the powdered material in the storage container can be subjected to vibration. This at the same time offers the advantage that no electrical connection is needed.

Preferably the vibration mechanism consists in that the grooved disk is provided with a toothed ring formed by radial flutes against which spring-biased elements are urged. Upon rotation of the grooved disk the spring-biased elements slide over the toothed ring to thereby produce percussion or vibration.

The vibration mechanism preferably also includes a base disk carrying the spring-biased elements and rotatable coaxially relative to the grooved disk and relative to the storage container. By rotation of the base disk vibration can be produced and at the same time the grooved disk can be rotated to thereby expose the discharge opening.

If the spring-biased elements are urged against the disk with sufficient force, the rotation of the base disk first carries along the grooved disk by frictional engagment, so that the blades move away from the discharge opening. When the blades have reached their end position, the grooved disk can be rotated no further relative to the storage container, so that then the spring-biased elements slide over the toothed ring of the grooved disk and produce vibrations. During the opening motion of the blades no vibration is produced.

The handling of the device can be further simplified in that the drawing cup is inserted into the opening of the base disk where it can be locked. Hence, by rotation of the drawing cup both the closing mechanism and the vibration mechansim can be actuated. The metering device of the invention is especially suited for metering coffee powder. In restaurants coffee machines are used which operate with different doses. Therefore, the coffee roaster is forced to pack coffee in widely varying non-standardized quantities, which adds to the packaging costs. With the metering device of the invention it is sufficient to fill a standard package of 2 kg coffee powder, for example, into the storage container. The coffee is then metered out by the volume of the drawing cup. It is thus sufficient to use a drawing cup of a volume suiting each individual coffee machine. For conventional restaurant coffee machines the volume of the drawing cup corresponds to from 60 and 250 grams coffee powder. The weight of the metered coffee powder varies by less than 1%.

An example of the invention will now be explained with reference to the drawing in which FIG. 1 shows a metering device in exploded view;

FIG. 2 shows a vertical section through the metering device; and

FIG. 3 shows the grooved disk of the metering device from below, with closed and open discharge opening.

The metering device has a storage container 10 in the form of an upright cylinder of 7 liters capacity, for example. On the bottom of the storage container 10 there is the closing mechanism 12 and the vibration mechanism 14, through which a defined quantity of the powdered material, e.g. coffee powder, is filled into a drawing cup 13. The metering device can be mounted upright to a wall, for example alongside a coffee machine.

FIG. 1 shows in an exploded view the individual parts of the metering device. The storage container 10 is a cylinder open at both ends with a disk-shaped foot 21 surrounding the lower rim. The inner cone of said foot 21 reduces the size of the discharge opening 11 relative to the size of the storage container 10, in order to keep the dimensions of the closing mechanism as small as possible. The open lower end of the storage container 10 reduced in size by the inner cone of the foot 21 is the discharge opening 11. In the illustrated example the storage container 10 consists of a tube length 33 and a base 34 inserted into the lower end of the tube length 33, narrows inwardly toward the discharge opening 11, and is made integral with the disk-shaped foot 21. Directly below the discharge opening 11 there is the closing mechanism 12 which is constructed similar to a blade diaphragm and comprises blades 16 in the form of about semicircular closing plates, and a grooved disk 17. The two blades 16 are supported for rotation about a pin 22 arranged just outside the discharge opening 11. The two pins 22 of the two blades 16 are mounted in exactly diametrical opposition in matching bores in the foot 21 of the storage container 10 at the margin of the discharge opening 11, so that each blade covers one half of the discharge opening 11. The pins 22 extend downwardly. The blades 16 extend beyond the pins 22 and have downwardly extending pins 23 at the ends of these extensions. Below the blades 16 there is the grooved disk 17 which has a central opening corresponding to the discharge opening 11 and is provided with radial slots or grooves 24. The downwardly extending pins 23 of the blades 16 are guided in the grooves 24 so that by counterclockwise rotation of the grooved disk 17—as seen in FIG. 1—the blades also move counterclockwise about the downwardly depending pins 22 and uncover the discharge opening 11. The pins 23 slide in the grooves inwardly toward the center. For complete exposure of the discharge opening 11 a rotation of the grooved disk 17 through about 10° is sufficient. The diameter of the grooved disk 17 somewhat exceeds twice the diameter of the discharge opening 11 or the central opening in the center of the grooved disk 17. In FIG. 3 the blades 16 and the grooved disk 17 are shown from below, and the numerals for the open position are indexed (16', 23' etc.). Below the closing mechanism 12 the vibration mechanism 14 is provided. The grooved disk 17 also forms a part of the vibration mechanism 14, and for this purpose it has on its underside radial flutes 18 forming a toothed ring. The vibration mechanism 14 further includes a base disk 20 disposed below the grooved disk 17 and having likewise a central opening matching the discharge opening 11. In three bores 25 helical compression springs 26 are accommodated which urge balls 27 against the toothed ring 18 of the grooved disk 17. Upon relative rotation between base disk 20 and grooved disk 17 the balls 27 slide over the toothed ring 18 thereby producing percussion or vibration resulting in uniform compacting or loosening of the powdered material.

FIG. 2 illustrates the metering device in vertical section. The assembly of storage container 10, blades 16, grooved disk 17, and base disk 20 ist held together in that a mounting ring 28 extending from below over the rim of the base disk 20 and a retainer disk 29 overlying the foot 21 of the storage container 10 are connected by screws 30 to the rim of the grooved disk 17. Hence, only the retainer disk 29, the grooved disk 17, and the mounting ring 28 are firmly connected together and can rotate as a unit about the foot 21 of the storage container 10. The base disk 20 ist held to the grooved disk 17 by the mounting ring 28 with sufficient clearance to allow rotation of the base disk 20 relative to the grooved disk 17. As mentioned before, during such rotation the balls slide over the toothed ring 18 to cause vibration or percussion.

The metering device is handled such that the drawing cup 13 is inserted from below into the central opening in the base disk 20. By suitable means the drawing cup 13 is locked with the base disk 20, e.g. by two pins depending from the rim of the base disk 20, between which the handle 32 of the drawing cup 13 is held. By means of said handle 32 the base disk 20 can be rotated. Upon such rotation of the base disk 20 counterclockwise—as viewed in FIG. 1—the grooved disk 17 first follows the rotation of the base disk so that the blades 16 are turned and uncover the discharge opening 11. Coffee powder or other powdered material can thereby flow into the drawing cup 13. As soon as the discharge opening 11 is fully uncovered by the blades 16, the blades 16 abut against the somewhat raised rim of the grooved disk 17 and block, i.e. prevent further rotation of, the grooved disk 17. Due to this blocking, the balls 27 slide over the toothed ring 18 thereby producing percussion or vibration of the entire metering device including the storage container 10 and the drawing cup 13. This compacts or loosens the powdered material uniformly so that in a drawing cup 13 of predetermined volume invariably the same amount by weight of powdered material is contained. By return rotation—clockwise in FIG. 1—of the drawing cup, and thus of the base disk 20 and the grooved disk 17, the blades 16 are moved toward one another so that they close the discharge opening 11. Thereby they virtually cut the column of powdered material extending from the bottom of the drawing cup 13 up into the storage container 10. Thereafter the drawing cup 13 can be pulled away from the base disk 20 and the metering operation is terminated. With a drawing cup of 382 cm$^3$ volume quantities of coffee powder from $141.7 \pm 1.3$ grams were obtained in 10 metering operations, so that the deviation was less than 1%. The capacity of the storage container was 7 liters.

The central openings in the grooved disk 17 and the base disk 20 are preferably somewhat larger than the discharge opening 11 in order to prevent soiling by the outflowing powdered material. To prevent powdered material from falling into the slot formed by the opening blades 16, the upper rim of the central opening in the grooved disk 17, and optionally also the lower rim of the discharge opening, may be provided with a brush.

The drawing cup 13 should preferably be removable only with closed discharge opening 11. This can be achieved, for example, by respective guidance of the handle 32 of the drawing cup 13 in a device similar to a bayonet catch. The drawing cup 13 is to be held in position by a combination of a bayonet catch and a latch mechanism from which it can be removed only by deliberate pressing of a button to thereby release the latch mechnism.

It is also possible to actuate the closing mechanism 12 and the vibration mechanism 14 independently of one another. For this purpose a laterally projecting handle is provided at the grooved disk 17, which permits rotation of the grooved disk 17 independently of the base disk 20. When the base disk 20 is fixedly connected to the foot 21 of the storage container 10, the closing mechanism and the vibration mechanism 14 are actuated simultaneously so that the powdered material is shaken already during the motion of the blades 16. This may be suitable especially when the blades 16 are to be only partially opened for certain types of powdered material.

We claim:
1. A metering device for powdered material which comprises:
    (1) a container for said powder;
    (2) a closeable discharge opening in the bottom of said container;
    (3) a closing mechanism containing blades similar to a diaphragm for opening and closing said discharge opening;
    (4) a rotatable groved disk operably connected to said closing mechanism to open and close the same, and, containing a toothed ring formed by radial flutes having a central opening in register with said discharge opening; and

(5) a vibration mechanism connected to said rotatable grooved disk and containing spring-biased elements contacting said radial flutes in such a manner so that when said toothed ring in said grooved disk slides over said spring-biased elements, a vibratory motion to the metering device is imparted.

2. The metering device of claim 1 wherein the vibration mechanism further comprises a base disk which is arranged coaxially with and adjacent to said grooved disk and rotatable relative to said container which likewise has a central opening in register with said discharge opening and said base disk contains said spring-biased elements.

3. The metering device of claim 2 wherein said spring-biased elements are urged against said grooved disk with such force that said base disk rotates relative to said grooved disk only after the blades of said closing mechanism have reached their open position where further rotation of said grooved disk relative to said container is blocked.

4. The metering device of claim 2 or 3 wherein a drawing cup can be locked in the central position of said base disk and said grooved disk can be rotated by rotation of said drawing cup until the blades of said closing mechanism have reached the open position.

* * * * *